(12) United States Patent
Robarge et al.

(10) Patent No.: US 8,264,809 B2
(45) Date of Patent: Sep. 11, 2012

(54) SYSTEM AND APPARATUS FOR CIRCUIT PROTECTION WITHIN AN EQUIPMENT ENCLOSURE

(75) Inventors: Dean Arthur Robarge, Southington, CT (US); Robert Joseph Caggiano, Wolcott, CT (US); George William Roscoe, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 108 days.

(21) Appl. No.: 12/882,811

(22) Filed: Sep. 15, 2010

(65) Prior Publication Data
US 2012/0063036 A1 Mar. 15, 2012

(51) Int. Cl.
*H01H 73/00* (2006.01)
(52) U.S. Cl. ........................................ 361/115
(58) Field of Classification Search ............... 361/115
See application file for complete search history.

(56) References Cited

U.S. PATENT DOCUMENTS

| | | | |
|---|---|---|---|
| 2,761,934 A * | 9/1956 | Wood et al. | 218/34 |
| 4,396,813 A | 8/1983 | Hesselbart et al. | |
| 4,914,549 A | 4/1990 | Leone et al. | |
| 5,200,585 A | 4/1993 | Davies et al. | |
| 5,337,210 A | 8/1994 | Ishikawa et al. | |
| 5,477,017 A | 12/1995 | Swindler et al. | |
| 6,265,678 B1 | 7/2001 | Robbins et al. | |
| 6,951,990 B1 | 10/2005 | Miller | |
| 7,019,230 B1 | 3/2006 | Vaill et al. | |
| 7,064,283 B2 | 6/2006 | Deylitz et al. | |
| 7,185,407 B2 | 3/2007 | Boyl-Davis et al. | |
| 7,821,749 B2 * | 10/2010 | Asokan et al. | 361/1 |
| 2008/0239598 A1 * | 10/2008 | Asokan et al. | 361/56 |
| 2009/0255791 A1 * | 10/2009 | Narayanan et al. | 200/50.26 |
| 2009/0308845 A1 * | 12/2009 | Bohori et al. | 218/157 |
| 2011/0278141 A1 * | 11/2011 | Weister et al. | 200/50.24 |
| 2011/0299226 A1 * | 12/2011 | Milovac et al. | 361/605 |
| 2011/0299228 A1 * | 12/2011 | Milovac et al. | 361/614 |

* cited by examiner

*Primary Examiner* — Ronald W Leja
(74) *Attorney, Agent, or Firm* — Global Patent Operation

(57) ABSTRACT

An arc transfer device for use in a switchgear includes at least one first electrical connector configured to connect the arc transfer device to a voltage supply within the switchgear, and a racking cassette. The racking cassette includes at least one second electrical connector that is configured to be electrically coupled to the at least one first electrical connector based on the racking position of the arc transfer device.

20 Claims, 9 Drawing Sheets

SYSTEM AND APPARATUS FOR CIRCUIT PROTECTION WITHIN AN EQUIPMENT ENCLOSURE

BACKGROUND OF THE INVENTION

The embodiments described herein relate generally to power equipment protection devices and, more particularly, to systems and apparatus for use in arc generation.

Known electric power circuits and switchgear generally have conductors that are separated by insulation, such as air, or gas or solid dielectrics. However, if the conductors are positioned too closely together, or if a voltage between the conductors exceeds the insulative properties of the insulation between the conductors, an arc can occur. The insulation between the conductors can become ionized, which makes the insulation conductive and enables formation of an arc flash.

An arc flash is caused by a rapid release of energy due to a fault between two phase conductors, between a phase conductor and a neutral conductor, or between a phase conductor and a ground point. Arc flash temperatures can reach or exceed 20,000° C., which can vaporize the conductors and adjacent equipment. Moreover, an arc flash can release significant energy in the form of heat, intense light, pressure waves, and/or sound waves, sufficient to damage the conductors and adjacent equipment. However, the current level of a fault that generates an arc flash is generally less than the current level of a short circuit, such that a circuit breaker may not trip or exhibits a delayed trip unless the circuit breaker is specifically designed to handle an arc fault condition. Although agencies and standards exist to regulate arc flash issues by mandating the use of personal protective clothing and equipment, there is no device established by regulation that eliminates arc flash.

Standard circuit protection devices, such as fuses and circuit breakers, generally do not react quickly enough to mitigate an arc flash. One known circuit protection device that exhibits a sufficiently rapid response is an electrical "crowbar," which utilizes a mechanical and/or electro-mechanical process by intentionally creating an electrical "short circuit" to divert the electrical energy away from the arc flash point. Such an intentional short circuit fault is then cleared by tripping a fuse or a circuit breaker. However, the intentional short circuit fault created using a crowbar may allow significant levels of current to flow through adjacent electrical equipment, thereby still enabling damage to the equipment.

Another known circuit protection device that exhibits a sufficiently rapid response is an arc containment device, which creates a contained arc to divert the electrical energy away from the arc flash point. At least some known arc containment devices are racked into equipment enclosures using racking frames that only enable the arc containment device to be either fully inserted and activated or fully withdrawn and deactivated. However, such a configuration does not enable use of the arc containment device in a test mode. Moreover, such a configuration does not enable the arc containment device to be inserted or removed from a live bus to avoid shutting down an entire set of electronics modules or equipment.

BRIEF DESCRIPTION OF THE INVENTION

In one aspect, an arc transfer device is provided for use with electrical equipment. The arc transfer device includes at least one first electrical connector configured to receive power from the electrical equipment, and a racking cassette having at least one second electrical connector configured to electrically couple the first electrical connector to the electrical equipment based on a racking position of the arc transfer device.

In another aspect, a circuit protection system is provided for use with a circuit. The circuit protection system includes a controller configured to detect an arc flash event in the circuit and an arc containment device operatively coupled to the controller and configured to generate an arc upon the detection of the arc flash event. The arc containment device includes a racking cassette that facilitates racking the arc containment device in a plurality of positions, wherein each of the plurality of positions is related to an operating status of the arc containment device.

In another aspect, a switchgear stack includes at least one circuit and a circuit protection system coupled to the circuit. The circuit protection system includes a controller configured to detect an arc flash event in the circuit, an arc containment device configured to initiate an arc in response to the detection of the arc flash event, and a racking cassette. The racking cassette includes at least one racking member configured to couple to the arc containment device, and a shaft coupled to the racking member and configured to drive the racking member in one of a first direction and a second direction based on a racking position of the arc containment device.

DETAILED DESCRIPTION OF THE INVENTION

Exemplary embodiments of systems and apparatus for use with a circuit protection device are described herein. These embodiments facilitate racking, such as positioning by inserting or withdrawing, an arc containment device to one of a plurality of positions within an equipment enclosure, such as a circuit breaker cubicle. Racking an arc containment device in multiple positions, such as a plurality of racking positions including disconnect, test, or connect positions, facilitates complete removal of the arc containment device in case of a replacement or partial removal of the arc containment device for service or testing.

Figure 1:
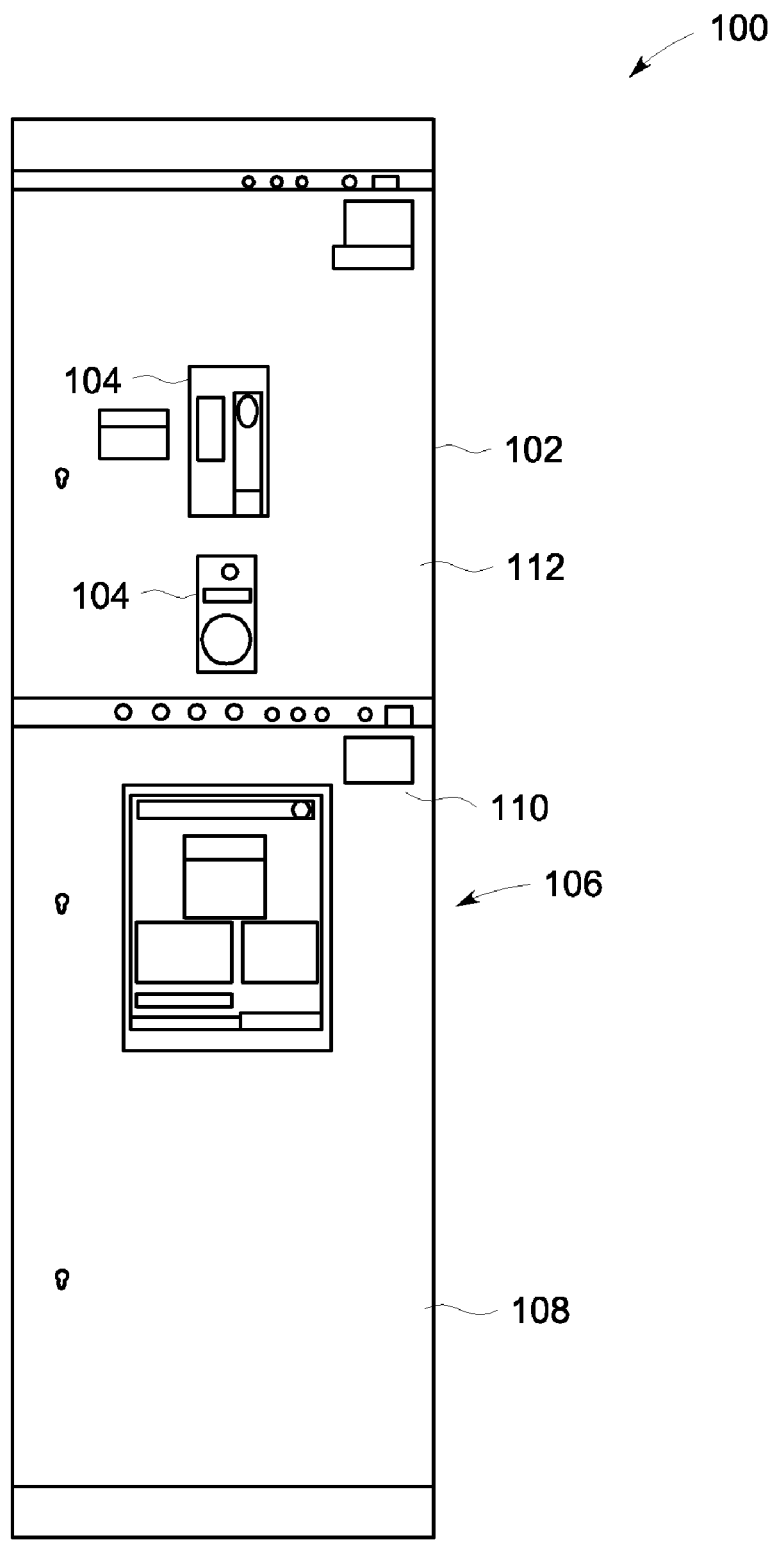
FIG. 1 is a front view of an exemplary switchgear stack that includes a circuit protection system.

FIG. 1 is a front view of an exemplary switchgear stack 100 that is housed within an equipment enclosure 102. Switchgear 100 includes one or more electronics modules 104 and a circuit protection system 106 that provides electronics modules 104 with protection from, for example, arc flash events. Enclosure 102 includes a plurality of compartments, including a lower compartment 108, a center compartment 110 that houses circuit protection system 106, and an upper compartment 112 that houses electronics modules 104. Notably, circuit protection system 106 includes an arc transfer device (not shown in FIG. 1) that transfers energy away from a detected arc flash event in a circuit, such as electronics module 104 or a power feed. The arc transfer device may be an arc containment device, which is described in greater detail below. Alternatively, the arc transfer device may be a bolted fault device that transfers the energy associated with the arc flash event to another location to dissipate in any suitable manner. In addition, it will be understood that enclosure 102 may include more or fewer than three compartments.

Figure 2:
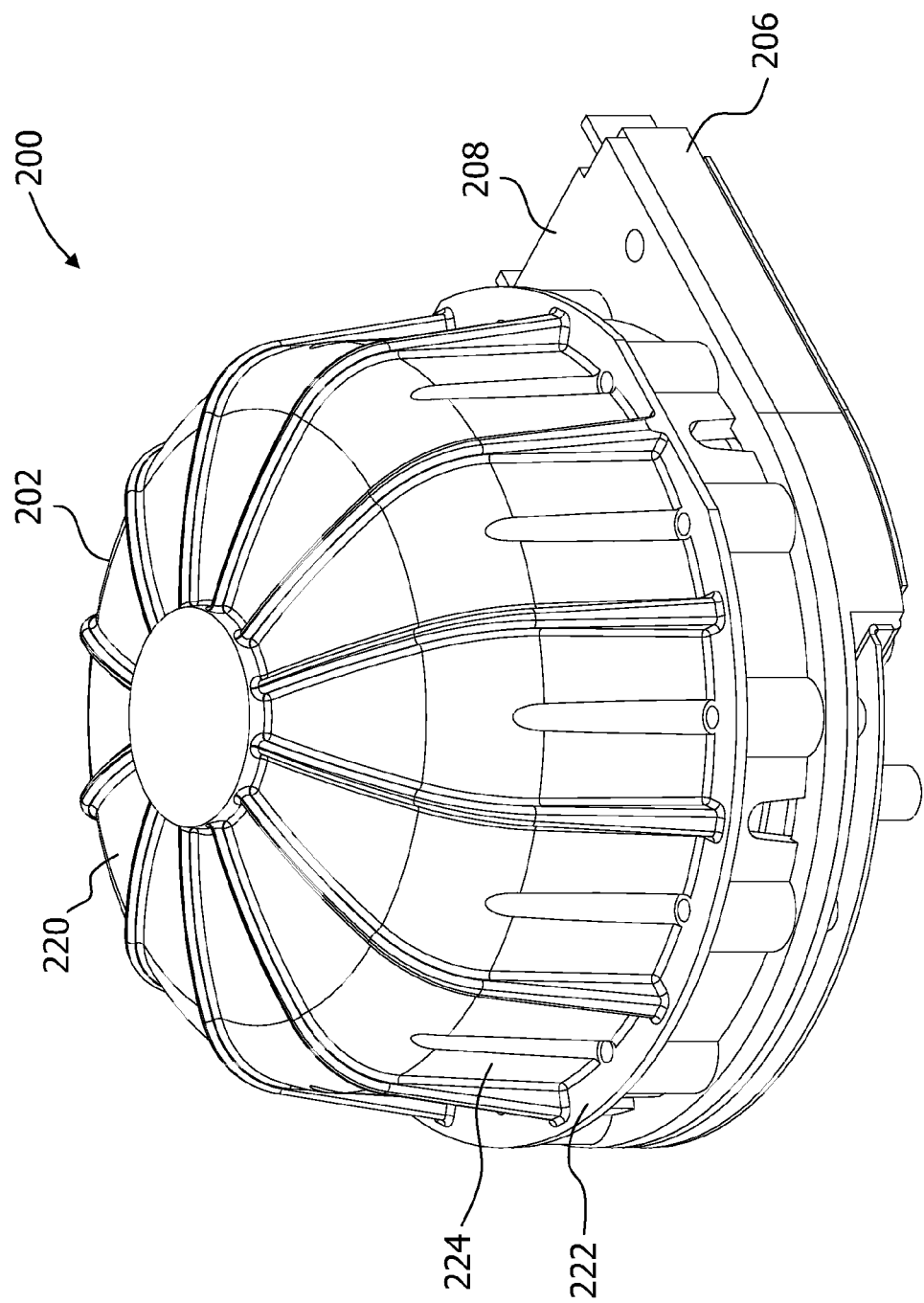
FIG. 2 is a perspective schematic diagram of an exemplary arc containment device that may be used with the circuit protection system shown in FIG. 1).
Figure 3:
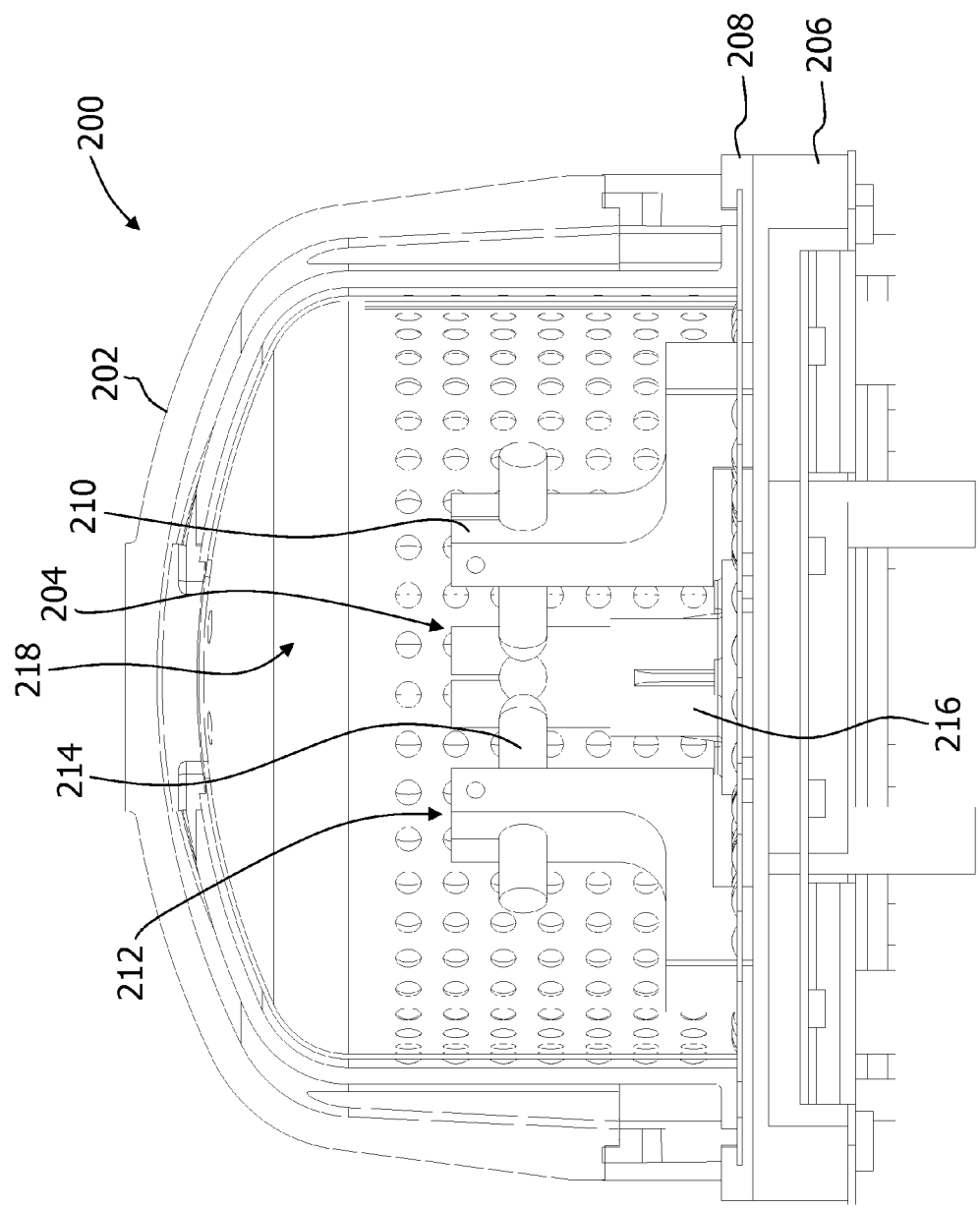
FIG. 3 is a cross-section schematic diagram of the arc containment device shown in FIG. 2.

FIG. 2 is a perspective schematic diagram of an exemplary arc containment device 200 that may be used with circuit protection system 106 (shown in FIG. 1), and FIG. 3 is a cross-section schematic diagram of arc containment device 200. In the exemplary embodiment, arc containment device 200 includes a top cover 202 and a conductor assembly 204. Conductor assembly 204 includes a conductor base 206 and a conductor cover 208 with a plurality of electrical conductors (not shown) positioned therebetween. Each electrical conductor is coupled to an electrode holder 210, and each electrode holder 210 is configured to support an electrode 214. For example, electrode 214 may be movably secured within a clamping portion 212 of electrode holder 210. Electrodes 214 are oriented along a plane such that each electrode 214 is approximately equidistant from an axis along which a plasma gun (not shown) emits an ablative plasma. The plasma gun is covered by a plasma gun cover 216.

In the exemplary embodiment, top cover 202 defines a main chamber 218 in which electrodes 214 generate an arc for use in dissipating energy associated with an arc flash event detected on a circuit. Top cover 202 includes a top surface 220, a lip 222, and a side surface 224 extending between top surface 220 and lip 222.

Figure 4:
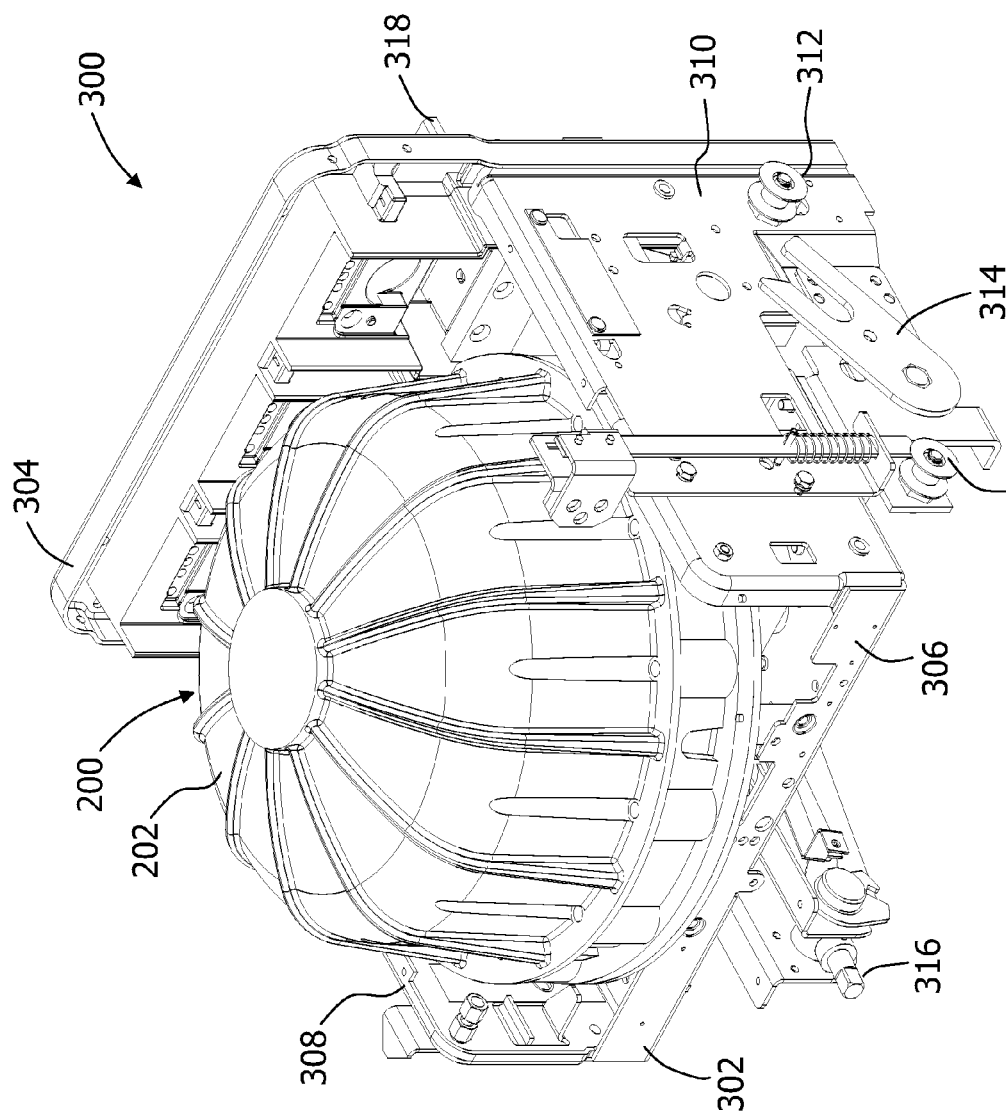
FIG. 4 is a perspective diagram of one embodiment of a racking cassette that may be used with the circuit protection system shown in FIG. 1.

FIG. 4 is a perspective diagram of one embodiment of a racking cassette 300 that may be used with circuit protection system 106. Racking cassette 300 includes a frame 302 configured to support arc containment device 200 therein. Frame 302 includes a rear wall 304, an opposite front wall 306, a first sidewall 308, and an opposite second sidewall 310. One or more racking rollers 312 and a racking member 314 are coupled to each sidewall 308 and 310 to facilitate racking arc containment device 200 in a plurality of positions. A racking shaft 316 is coupled to frame 302, and at least one primary contact 318 is provided on rear wall 304 to facilitate connecting to a line voltage of switchgear 100 (shown in FIG. 1). Racking cassette 300 also includes at least one secondary contact (not shown) that facilitates connecting to a control voltage of switchgear 100.

When arc containment device 200 is racked in a first position, such as a disconnect position, rollers 312 are at rest on or within a corresponding set of rails (not shown) that are provided within a compartment of equipment enclosure 102 (shown in FIG. 1). Moreover, primary contact 318 and the secondary contact are both disengaged from their corresponding voltage connections. Accordingly, arc containment device 200 is not functional at the first position.

When arc containment device 200 is racked in a second position, such as a test position, rollers 312 have moved a predetermined distance along the compartment rails. For example, racking shaft 316 has been turned a predetermined amount or to a predetermined point to advance rollers 312 along the compartment rails. Moreover, in the second position, racking members 314 are partially engaged with racking rollers (not shown) provided within the compartment. Furthermore, primary contact 318 is disengaged from the line voltage of switchgear 100, and the secondary contact is engaged with the control voltage of switchgear 100. Accordingly, when arc containment device 200 is racked in the second position a controller (not shown) can be used to verify circuitry and/or plasma gun operation within arc containment device 200.

When arc containment device 200 is racked in a third position, such as a connect position, rollers 312 have moved an additional distance along the compartment rails. For example, racking shaft 316 has been turned an additional predetermined amount or to a different predetermined point to advance rollers 312 along the compartment rails. Moreover, in the third position, racking members 314 are fully engaged with the racking rollers provided within the compartment. Primary contact 318 is engaged with the line voltage of switchgear 100, and the secondary contact is engaged with the control voltage of switchgear 100. Accordingly, when arc containment device 200 is racked in the third position arc containment device 200 is fully operational.

Figure 5:
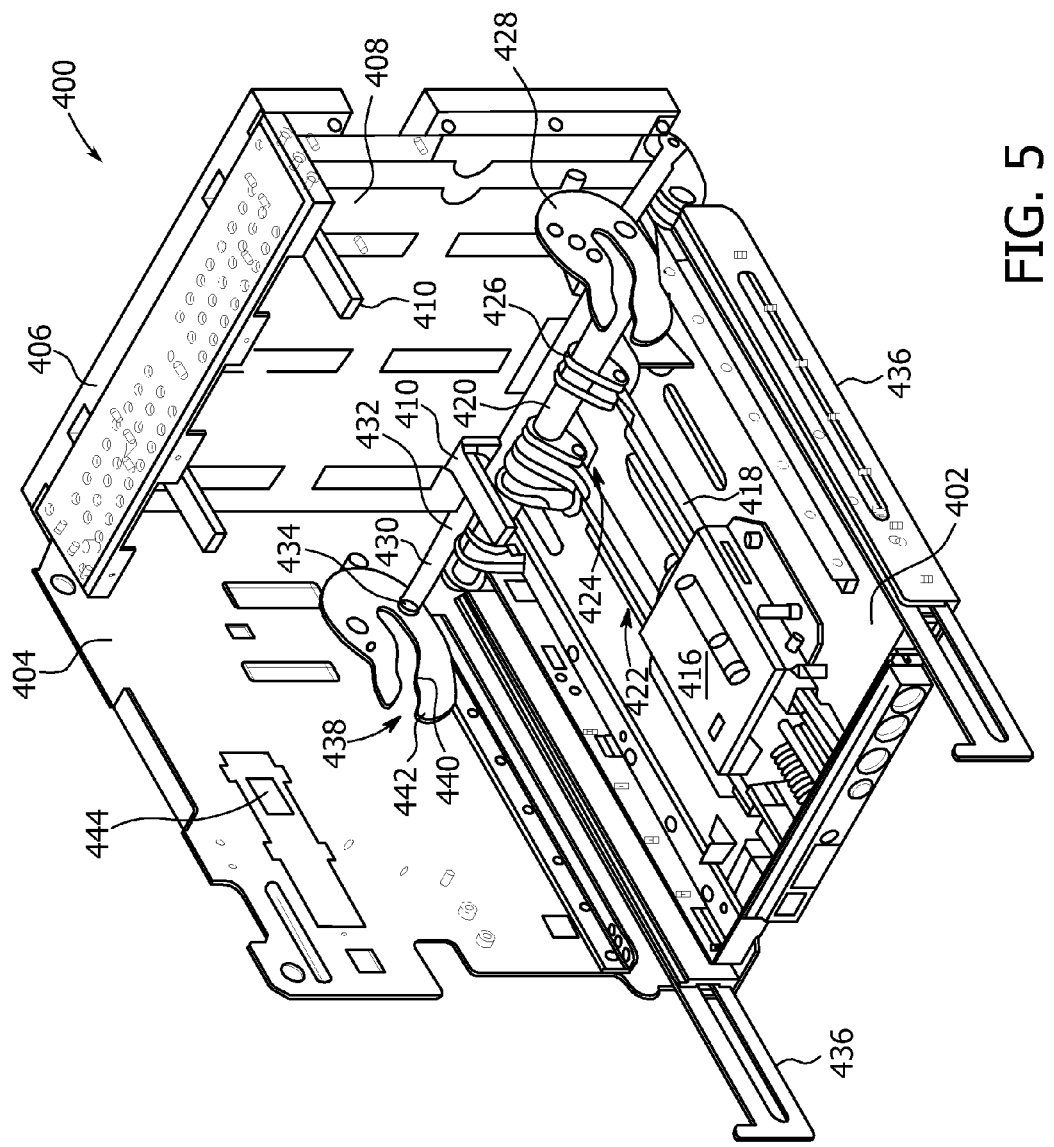
FIG. 5 is a perspective schematic diagram of another embodiment of a racking cassette that may be used with the circuit protection system shown in FIG. 1.
Figure 6:
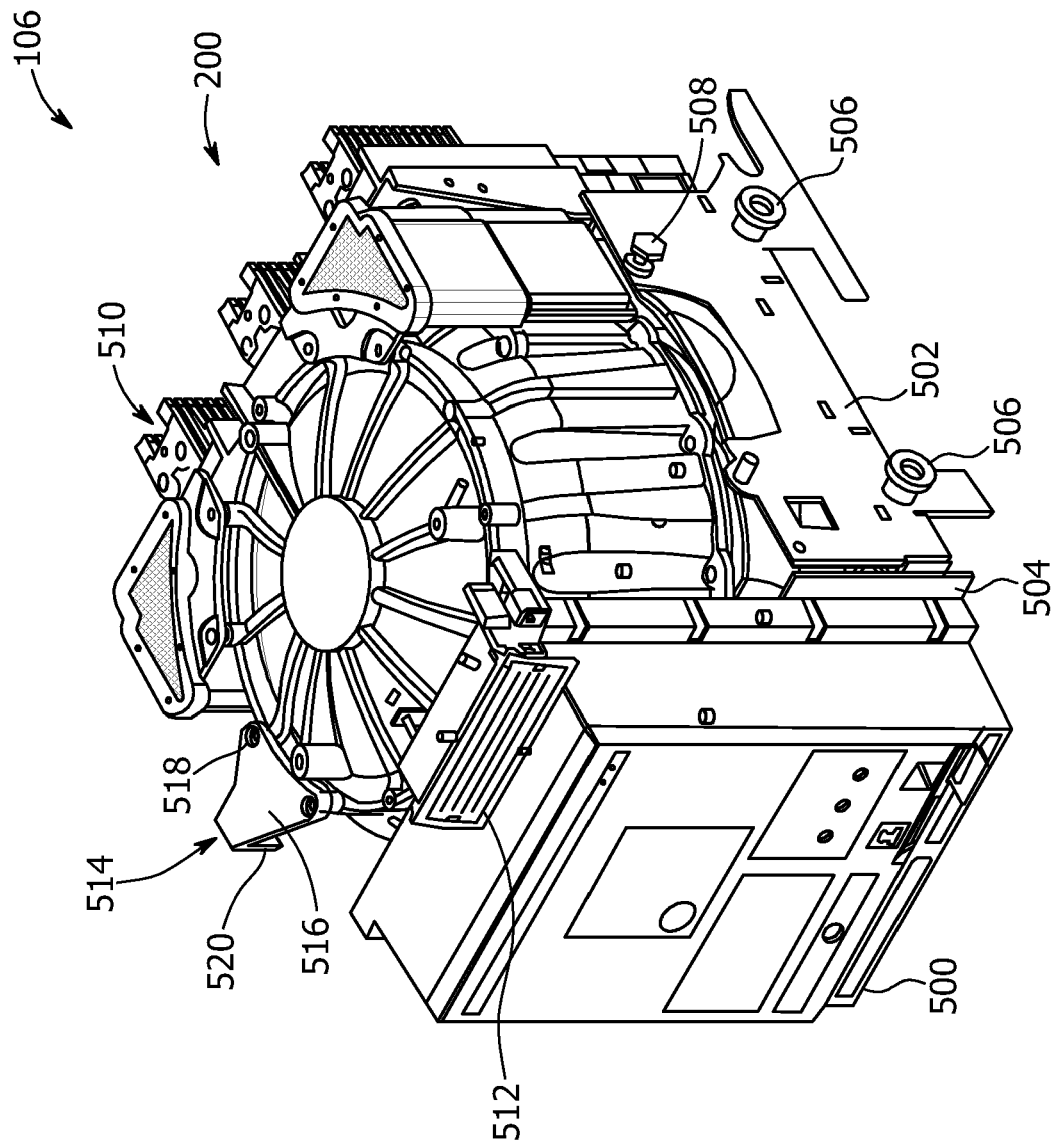
FIG. 6 is a perspective schematic diagram of the circuit protection system shown in FIG. 1 configured for use with the racking cassette shown in FIG. 5.

FIG. 5 is a perspective schematic diagram of another exemplary racking cassette 400 that may be used with circuit protection system 106 (shown in FIG. 1). FIG. 6 is a perspective schematic diagram of circuit protection system 106 configured for use with racking cassette 400. Racking cassette 400 is configured to support arc containment device 200 (shown in FIGS. 2 and 3) and facilitates racking circuit protection system 106 in an equipment rack (not shown) within enclosure 102 (shown in FIG. 1). In the exemplary embodiment, racking cassette 400 includes a bottom surface or tray 402, a first side sheet 404, and an opposite second side sheet (not shown). A rear wall 406 extends between first side sheet 404 and the second side sheet. Moreover, racking cassette 400 includes a plurality of projections 410 that extend from rear wall 406 through an inner wall 408. Projections 410 are movable with respect to inner wall 408 such that, when arc containment device 200 is inserted into racking cassette 400, as described in greater detail below, projections 410 are pushed back into rear wall 406 to expose the second primary connectors.

In the exemplary embodiment, circuit protection system 106 includes a controller 500 and arc containment device 200. A plurality of plates is coupled to arc containment device 200, including two side plates 502 and a front plate 504. Controller 500 is coupled to front plate 502 to secure controller 500 to arc containment device 200 when inserting or removing circuit protection system 106 from equipment enclosure 102 (shown in FIG. 1). Side plates 502 include one or more rollers 506 that are sized to be inserted into or used with racking rails (not shown) provided within an enclosure compartment, such as center compartment 110 (shown in FIG. 1).

Moreover, a connector 508 extends through each side plate 502 and is secured in arc containment device 200. For example, connector 508 may be secured in conductor base 210 or in conductor cover 212 (both shown in FIGS. 2 and 3). Arc containment device 200 also includes at least one first electrical connector. For example, arc containment device 200 includes a plurality of first primary electrical connectors 510 that facilitate electrically connecting arc containment device 200 to a plurality of conductors (not shown) of a circuit (not shown) that is being monitored and/or protected by arc containment device 200. First primary connectors 510 are configured to couple to a corresponding plurality of second primary connectors (not shown) that are positioned between rear wall 406 and inner wall 408 to connect arc containment device 200 to a line voltage of switchgear 100 (shown in FIG. 1). Moreover, controller 500 includes a first secondary electrical connector 512 that facilitates connecting controller 500 to a second secondary connector (not shown) for use in performing diagnostics and/or plasma gun firing tests. A position indicator 514 is coupled to top cover 202 and is oriented to engage a switch that is provided in racking cassette 400 to facilitate indicating a position of arc containment device 200 within racking cassette 400. For example, position indicator 514 includes a flange 516 having one or more mounting apertures 518 extending therethrough and sized to receive a respective fastening mechanism to couple position indicator 514 to top cover 202. Accordingly, top cover 202 includes one or more corresponding mounting apertures (not shown) that are positioned beneath respective mounting apertures 518 of flange 516. Notably, position indicator 514 may be coupled to any suitable portion of arc containment device 200 that enables the switch to indicate the position of arc containment device 200 within racking cassette 400.

When circuit protection system 106 is racked in a first position, such as a disconnect position, within the equipment rack, first primary connectors 510 are disconnected from the second primary connectors, and first secondary connector 512 is disconnected from second secondary connector 412. In addition, projections 410 move forward away from rear wall 406 to shield the second primary connectors behind inner wall 408. When circuit protection system 106 is racked in the disconnect position, circuit protection system 106 may be removed from the equipment rack to be serviced and/or replaced. Moreover, position indicator 514 engages a switch 444 that is provided along first side sheet 404. Switch 444 transmits a signal to a switchgear controller (not shown) to indicate that arc containment device 200 is ready to be racked in. Furthermore, a door (not shown) of enclosure 102 can be shut before arc containment device 200 is racked in.

When circuit protection system 106 is racked in a second position, such as a test position, within the equipment rack, first primary connectors 510 are disconnected from the second primary connectors, and first secondary connector 512 is electrically coupled to second secondary connector 412. Specifically, second secondary connector 412 moves forward away from rear wall 406 along a shaft 414 to maintain the electrical connection to first secondary connector 512. When circuit protection system 100 is racked in the test position, arc containment device 200 is in a test mode that enables testing of a device interface and signal controls. For example, power is supplied to controller 500 for testing arc flash detection components and/or for testing whether the plasma gun capacitor bank is charging properly during the connect mode.

When circuit protection system 106 is racked in a third position, such as a connected position, within the equipment rack, first primary connectors 510 are electrically coupled to the second primary connectors, and first secondary connector 512 is electrically coupled to a second secondary connector 412. Specifically, projections 410 are pushed back and into rear wall 406 to expose the second primary connectors and first primary connectors 510 connected thereto. When circuit protection system 100 is racked in the connected position, arc containment device 200 is active. For example, power is supplied to controller 500 for charging a plasma gun capacitor bank (not shown) that is used to provide power to a plasma gun (not shown) for use in initiating an arc between electrodes 214 (shown in FIGS. 2 and 3).

Moreover, in the exemplary embodiment, racking cassette 400 includes a crank mechanism 416, a plurality of first links 418, and a shaft 420. Each first link 418 is coupled to crank mechanism 416 at a first end 422 and to shaft 420 at a second end 424 via a respective interlock 426. Racking cassette 400 also includes a plurality of racking members 428 that are connected to shaft 420 via respective second links 430. Specifically, each second link 430 is coupled to shaft 420 at a first end 432 and to a respective racking member 428 at a second end 434. Tray 402 may be inserted or removed from racking cassette 400 along side rails 436 that are coupled to first side sheet 404 and the second side sheet. Inserting tray 402 into racking cassette 400 causes crank mechanism 416 to move first links 418 back toward rear wall 406. The movement of first links 418 causes each interlock 426 to rotate, thereby causing shaft 420 to similarly rotate in a clockwise direction. The rotation of shaft 420 causes second links 430 to drive or rotate each racking member 428 in a clockwise direction. Each racking member 428 includes a slot 438 sized to receive connector 508 that is provided along a side surface of arc containment device 200. The rotation of racking member 428 causes connector 508 to move along slot 438 towards rear wall 406, and into either the first position or the second position. A lip 440 provided in each racking member 428 locks connector 508 in either the first position or the second position. For example, arc containment device 200 is locked in the first position when connector 508 moves over lip 440 towards rear wall 406. However, arc containment device 200 is locked in the second position when connector 508 is positioned between lip 440 and an end portion 442 of racking member 428.

Figure 7:
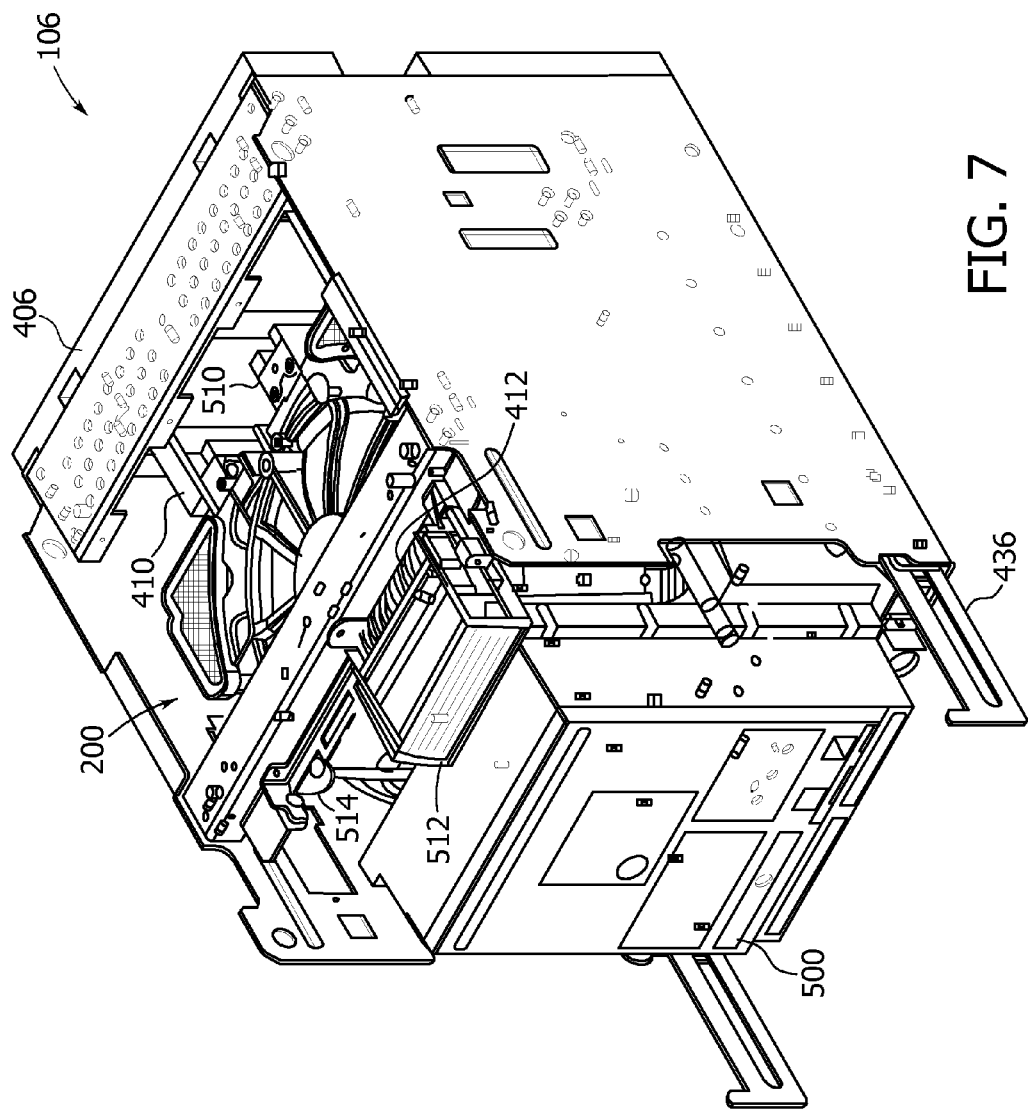
FIG. 7 is a perspective schematic diagram of the circuit protection system shown in FIG. 1 in a first or "disconnect" position.
Figure 8:
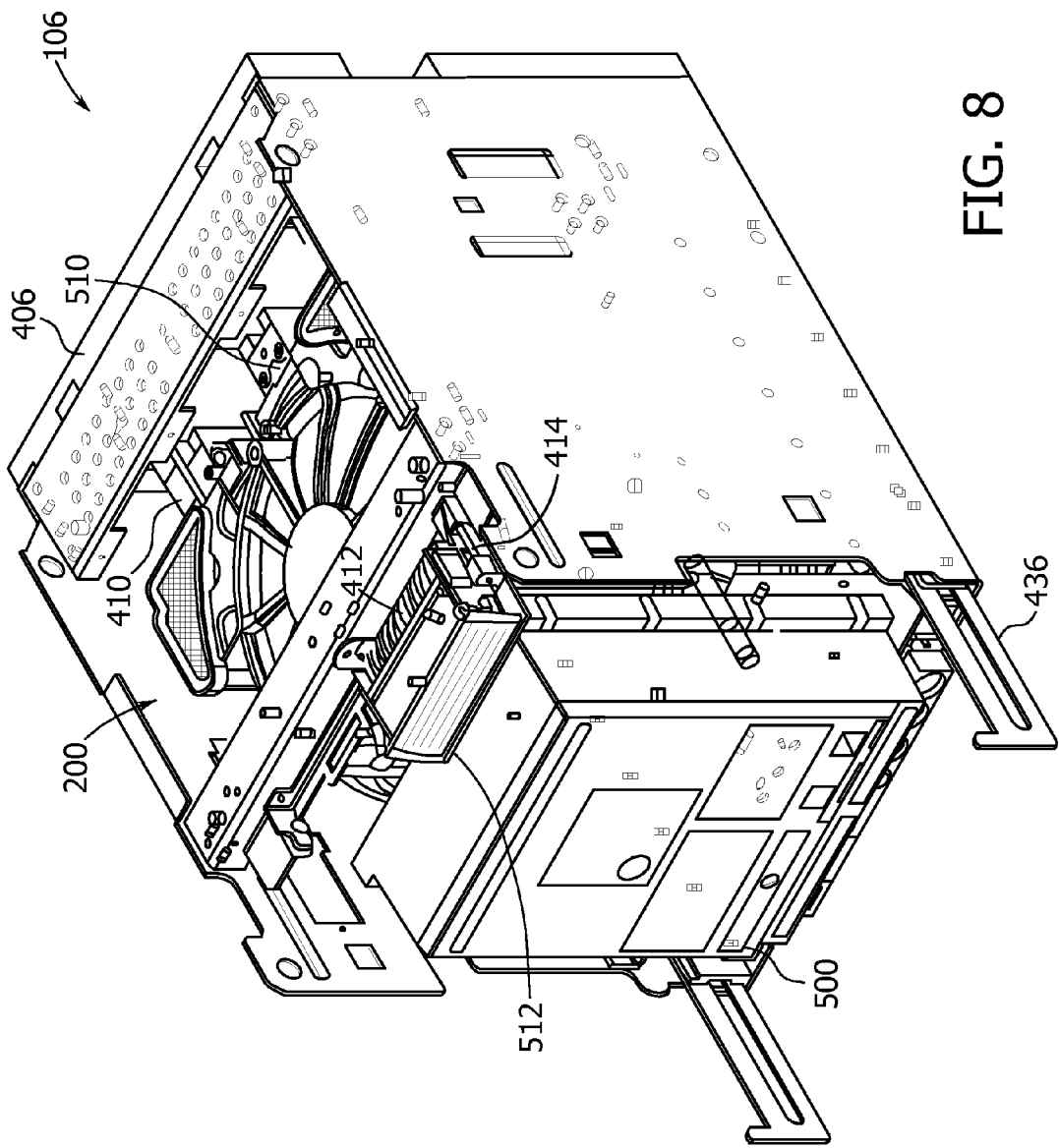
FIG. 8 is a perspective schematic diagram of the circuit protection system shown in FIG. 1 in a second or "test" position.
Figure 9:
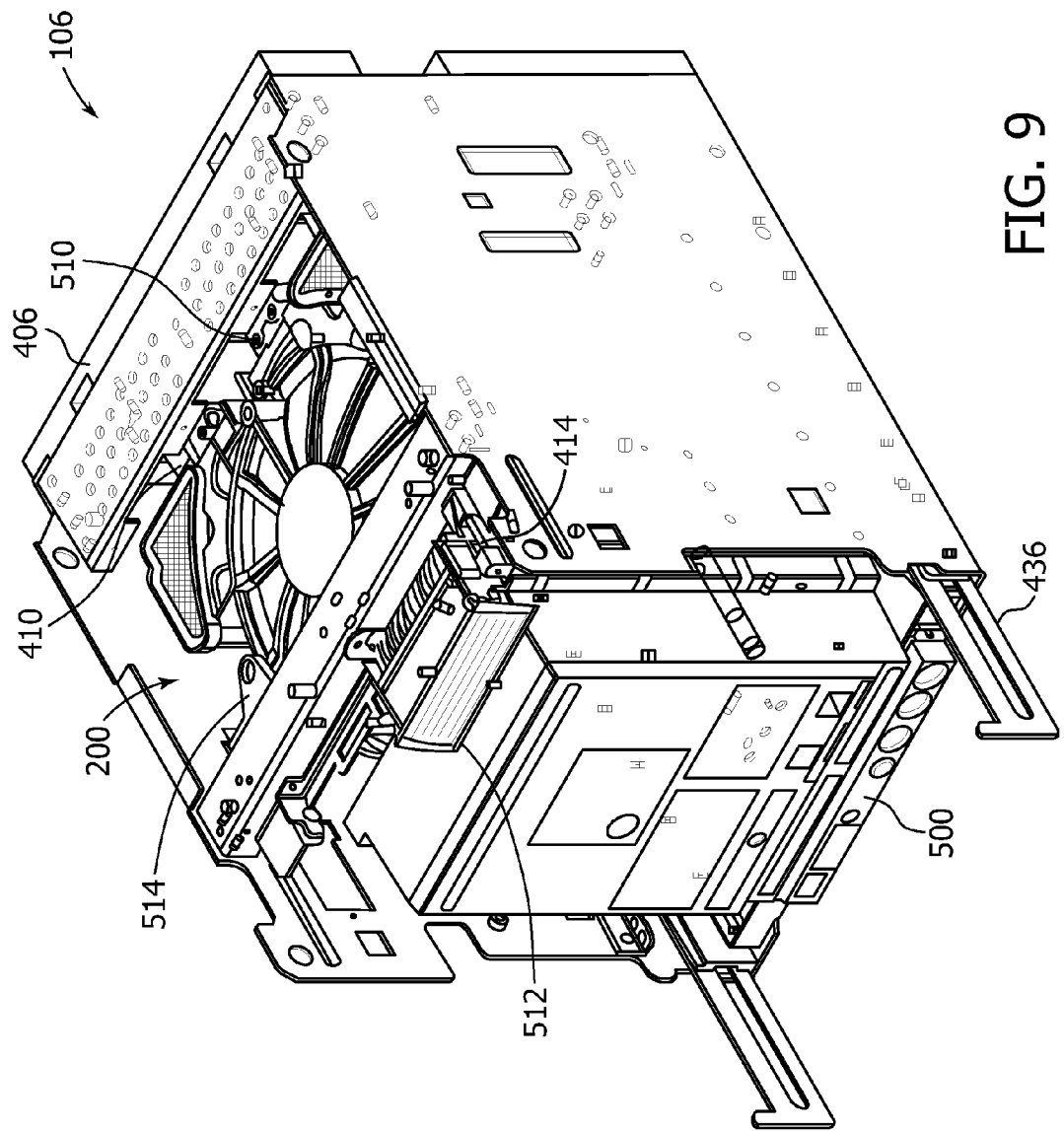
FIG. 9 is a perspective schematic diagram of the circuit protection system shown in FIG. 1 in a third or "connect" position.

FIGS. 7-9 illustrate the multiple positions in which circuit protection system 106 may be racked within an equipment rack provided in equipment enclosure 102 (shown in FIG. 1). Specifically, FIG. 7 illustrates a first or disconnect position, FIG. 8 illustrates a second or test position, and FIG. 9 illustrates a third or connect position.

As shown in FIG. 7, and when circuit protection system 106 is racked in the first position, first primary connectors 510 are disconnected from the second primary connectors (not shown), and first secondary connector 512 is disconnected from second secondary connector 412. Similarly, projections 410 move forward away from rear wall 406 to shield the second primary connectors. Moreover, when moving arc containment device 200 into the first position along rails 436 from the second or third positions, connectors 508 each move over a respective racking ear lip 440 away from rear wall 406. In addition, racking members 428 rotate counterclockwise to release connectors 508 from the second position. When circuit protection system 106 is racked in the disconnect position, circuit protection system 106 may be removed from the equipment rack to be serviced and/or replaced. Moreover, when initially racking arc containment device 200, position indicator 514 engages a switch 444 that is provided along first side sheet 404.

As shown in FIG. 8, and when circuit protection system 106 is racked in the second position, first primary connectors 510 are disconnected from the second primary connectors (not shown), and first secondary connector 512 is electrically coupled to second secondary connector 412. Specifically, second secondary connector 412 moves forward away from rear wall 406 along shaft 414 to maintain the electrical connection to first secondary connector 512. Moreover, when circuit protection system 106 is moved into the second position along rails 436, connectors 508 each move over a respective racking ear lip 440 away from rear wall 406. In addition, racking members 428 rotate counterclockwise to further engage connectors 508 from the first position, and lock connectors 508 in the second position. When circuit protection system 106 is racked in the second position, arc containment device 200 is in a test mode that enables testing of a device interface and signal controls. For example, power is supplied to controller 500 for testing arc flash detection components and/or for testing whether the plasma gun capacitor bank is charging properly during the connect mode.

As shown in FIG. 9, and when circuit protection system 106 is racked in the third position, first primary connectors 510 are electrically coupled to the second primary connectors (not shown), and first secondary connector 512 is electrically coupled to second secondary connector 412. Moreover, when circuit protection system 106 is moved into the third position along rails 436, connectors 508 (shown in FIG. 6) each move over a respective racking ear lip 440 (shown in FIG. 5) towards rear wall 406. In addition, racking members 428 (shown in FIG. 5) rotate clockwise to lock connectors 508 in place. When circuit protection system 106 is racked in the third position, arc containment device 200 is active. For example, power is supplied to controller 500 for charging a plasma gun capacitor bank (not shown) that is used to provide power to a plasma gun (not shown) for use in initiating an arc between electrodes 214 (shown in FIG. 3).

Exemplary embodiments of apparatus for use in devices for protection of power distribution equipment are described above in detail. The apparatus are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

Although the present invention is described in connection with an exemplary power distribution environment, embodiments of the invention are operational with numerous other general purpose or special purpose power distribution environments or configurations. The power distribution environment is not intended to suggest any limitation as to the scope of use or functionality of any aspect of the invention. Moreover, the power distribution environment should not be interpreted as having any dependency or requirement relating to any one or combination of components illustrated in the exemplary operating environment.

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An arc transfer device for use with electrical equipment, said arc transfer device comprising:

at least one first electrical connector configured to receive power from the electrical equipment; and
a racking cassette comprising at least one second electrical connector configured to electrically couple said at least one first electrical connector to the electrical equipment based on a racking position of said arc transfer device.

2. An arc transfer device in accordance with claim 1, wherein said arc transfer device further comprises at least one connector, and said racking cassette further comprises at least one racking member comprising a slot sized to receive said at least one connector based on a racking position of said arc transfer device.

3. An arc transfer device in accordance with claim 2, wherein said racking cassette further comprises a crank mechanism and a shaft, said shaft coupled to said crank mechanism and to said at least one racking member such that said arc transfer device is configured to be racked in a plurality of positions within said racking cassette.

4. An arc transfer device in accordance with claim 1, wherein said at least one first electrical connector comprises at least one first primary connector and a first secondary connector, and said at least one second electrical connector comprises at least one second primary connector and a second secondary connector, wherein:
   when said arc transfer device is racked in a first position, said at least one first primary connector is disconnected from said at least one second primary connector and said first secondary connector is disconnected from said at least one second secondary connector;
   when said arc transfer device is racked in a second position, said at least one first primary connector is disconnected from said at least one second primary connector and said first secondary connector is electrically coupled to said second secondary connector; and
   when said arc transfer device is racked in a third position, said at least one first primary connector is electrically coupled to said at least one second primary connector and said first secondary connector is electrically coupled to said second secondary connector.

5. An arc transfer device in accordance with claim 4, wherein said racking cassette further comprises at least one projection configured to expose said at least one second primary connector when said arc transfer device is racked in the third position.

6. An arc transfer device in accordance with claim 5, wherein said at least one projection is configured to shield said at least one second primary connector when said arc transfer device is not racked in the third position.

7. An arc transfer device in accordance with claim 1, further comprising a position indicator, wherein said racking cassette further comprises a switch, and said position indicator is configured to interact with said switch based on the racking position of said arc transfer device, and said switch is configured to provide an indication of the racking position of said arc transfer device to the electrical equipment.

8. An arc transfer device in accordance with claim 1, wherein said arc transfer device comprises an arc containment device.

9. A circuit protection system for use with a circuit, said circuit protection system comprising:
   a controller configured to detect an arc flash event in the circuit; and
   an arc containment device operatively coupled to said controller and configured to generate an arc upon the detection of the arc flash event, said arc containment device comprising a racking cassette that facilitates racking said arc containment device in a plurality of positions, each of the plurality of positions related to an operating status of said arc containment device.

10. A circuit protection system in accordance with claim 9, wherein said arc containment device further comprises at least one connector, and said racking cassette comprises at least one racking member comprising a slot that is sized to receive said at least one connector.

11. A circuit protection system in accordance with claim 10, wherein said racking cassette further comprises a crank mechanism and a shaft, said shaft coupled to said crank mechanism and to said at least one racking member such that said arc containment device is configured to be racked in the plurality of positions.

12. A circuit protection system in accordance with claim 10, wherein said arc containment device further comprises at least one first primary connector and a first secondary connector, and said racking cassette further comprises at least one second primary connector and a second secondary connector, wherein:
  when said arc containment device is racked in a first position, said at least one first primary connector is disconnected from said at least one second primary connector and said first secondary connector is disconnected from said second secondary connector;
  when said arc containment device is racked in a second position, said at least one first primary connector is disconnected from said at least one second primary connector and said first secondary connector is electrically coupled to said second secondary connector; and
  when said arc containment device is racked in a third position, said at least one first primary connector is electrically coupled to said at least one second primary connector and said first secondary connector is electrically coupled to said second secondary connector.

13. A circuit protection system in accordance with claim 12, wherein said racking cassette further comprises at least one projection configured to expose said at least one second primary connector when said arc containment device is racked in the third position.

14. A circuit protection system in accordance with claim 9, wherein said arc containment device further comprises a position indicator, said racking cassette further comprises a switch, and said position indicator is configured to interact with said switch based on a racking position of said arc transfer device.

15. A switchgear stack comprising:
  at least one circuit; and
  a circuit protection system coupled to said at least one circuit, said circuit protection system comprising:
    a controller configured to detect an arc flash event in said at least one circuit;
    an arc containment device configured to initiate an arc in response to the detection of the arc flash event; and
    a racking cassette comprising:
      at least one racking member configured to couple to said arc containment device; and
      a shaft coupled to said at least one racking member and configured to drive said at least one racking member in one of a first direction and a second direction based on a racking position of said arc containment device.

16. A switchgear stack in accordance with claim 15, wherein said racking cassette further comprises:
  at least one first link coupled to said shaft; and
  a crank mechanism coupled to said at least one first link and configured to drive said shaft in one of the first direction and the second direction based on the racking position of said arc containment device.

17. A switchgear stack in accordance with claim 15, wherein said arc containment device further comprises at least one first primary connector and a first secondary connector, and said racking cassette further comprises at least one second primary connector and a second secondary connector, wherein:
  when said arc containment device is racked in a first position, said at least one first primary connector is disconnected from said at least one second primary connector and said first secondary connector is disconnected from said second secondary connector;
  when said arc containment device is racked in a second position, said at least one first primary connector is disconnected from said at least one second primary connector and said first secondary connector is electrically coupled to said second secondary connector; and
  when said arc containment device is racked in a third position, said at least one first primary connector is electrically coupled to said at least one second primary connector and said first secondary connector is electrically coupled to said second secondary connector.

18. A switchgear stack in accordance with claim 17, wherein said racking cassette further comprises at least one projection configured to expose said at least one second primary connector when said arc containment device is racked in the third position.

19. A switchgear stack in accordance with claim 15, wherein said arc containment device further comprises a position indicator, said racking cassette further comprises a switch, and said position indicator is configured to interact with said switch based on the racking position of said arc containment device.

20. A switchgear stack in accordance with claim 19, wherein said switch is configured to provide an indication of the racking position of said arc containment device to said switchgear stack.

* * * * *